(12) United States Patent
Baumann et al.

(10) Patent No.: US 11,046,166 B2
(45) Date of Patent: Jun. 29, 2021

(54) COUPLING MODULE FOR A DRIVE TRAIN OF A MOTOR VEHICLE

(71) Applicant: Schaeffler Technologies AG & Co. KG, Herzogenaurach (DE)

(72) Inventors: Michael Baumann, Lauf (DE); Aurelie Keller, Oberhoffen sur Moder (FR); Karl-Ludwig Kimmig, Oteenhöfen (DE); Ivo Agner, Bühl (DE)

(73) Assignee: Schaeffler Technologies AG & Co KG, Herzogenaurach (DE)

( * ) Notice: Subject to any disclaimer, the term of this patent is extended or adjusted under 35 U.S.C. 154(b) by 339 days.

(21) Appl. No.: 15/743,075

(22) PCT Filed: Jul. 12, 2016

(86) PCT No.: PCT/DE2016/200315
§ 371 (c)(1),
(2) Date: Jan. 9, 2018

(87) PCT Pub. No.: WO2017/008803
PCT Pub. Date: Jan. 19, 2017

(65) Prior Publication Data
US 2019/0118637 A1    Apr. 25, 2019

(30) Foreign Application Priority Data

Jul. 13, 2015  (DE) .......................... 102015213101.7

(51) Int. Cl.
*F16D 21/06*        (2006.01)
*B60K 6/38*         (2007.10)
(Continued)

(52) U.S. Cl.
CPC ................ *B60K 6/387* (2013.01); *B60K 6/40* (2013.01); *B60K 6/405* (2013.01); *F16D 13/385* (2013.01);
(Continued)

(58) Field of Classification Search
CPC .......... B60K 6/387; B60K 6/405; B60K 6/40; F16D 13/40; F16D 13/70; F16D 25/14;
(Continued)

(56) References Cited

U.S. PATENT DOCUMENTS 4,346,773 A * 8/1982 Hofbauer ................ F16D 21/08
                                                  180/165
5,691,588 A * 11/1997 Lutz ....................... B60K 6/387
                                                  310/92

(Continued)

FOREIGN PATENT DOCUMENTS

CN    101542152 A    9/2009
CN    102667205 A    9/2012
(Continued)

OTHER PUBLICATIONS

Ruder, Torque transmission device arranged in powertrain of hybrid vehicle, has centrifugal force pendulum for damping vibrations, which is arranged axially inside rotor of electric drive, 2014, 51 pages (Year: 2014).*

(Continued)

*Primary Examiner* — Ernesto A Suarez
*Assistant Examiner* — Lillian T Nguyen
(74) *Attorney, Agent, or Firm* — Kevin L. Parks

(57) ABSTRACT

A hybrid module has an intermediate element via which a counter plate, or at least one of the counter plates, of a coupling device is fixedly connected to a rotor element. At least one pressure plate and/or intermediate plate of the coupling device is here connected rotationally fixedly but axially displaceably to the rotor element via the at least one intermediate element. The result is a compact plate connection which is advantageous in particular for multiplate clutches. The intermediate element may be arranged radially (Continued)

outside the plates (pressure plate(s), counter plate(s) and any intermediate plates) of the coupling device.

17 Claims, 3 Drawing Sheets

(51) Int. Cl.
| | | |
|---|---|---|
| *B60K 6/387* | (2007.10) | |
| *F16D 13/38* | (2006.01) | |
| *B60K 6/40* | (2007.10) | |
| *F16D 48/02* | (2006.01) | |
| *B60K 6/405* | (2007.10) | |
| *F16D 13/40* | (2006.01) | |
| *F16D 13/70* | (2006.01) | |
| *F16D 25/0635* | (2006.01) | |
| *F16D 25/08* | (2006.01) | |

(52) U.S. Cl.
CPC ............ *F16D 13/40* (2013.01); *F16D 13/70* (2013.01); *F16D 21/06* (2013.01); *F16D 25/14* (2013.01); *B60Y 2200/92* (2013.01); *F16D 25/0635* (2013.01); *F16D 25/082* (2013.01); *F16D 2013/706* (2013.01); *F16D 2021/0615* (2013.01); *F16D 2021/0653* (2013.01); *F16D 2021/0669* (2013.01); *F16D 2500/1066* (2013.01); *Y10S 903/914* (2013.01)

(58) Field of Classification Search
CPC .... F16D 13/385; F16D 21/06; F16D 25/0635; F16D 2013/706; F16D 2021/0615; F16D 2021/0653; F16D 2021/0669; F16D 2500/1066; B60Y 2200/92; Y10S 903/914
See application file for complete search history.

(56) References Cited

U.S. PATENT DOCUMENTS

| | | | | |
|---|---|---|---|---|
| 5,755,302 A | * | 5/1998 | Lutz | F16D 13/50 |
| | | | | 180/65.21 |
| 6,273,229 B1 | * | 8/2001 | Kimmig | F16D 13/58 |
| | | | | 192/111.3 |
| 6,302,253 B1 | * | 10/2001 | Link | F02N 11/04 |
| | | | | 192/55.61 |
| 8,590,685 B2 | * | 11/2013 | Noehl | F16C 33/58 |
| | | | | 192/48.606 |
| 8,991,578 B2 | * | 3/2015 | Tanaka | F16D 13/585 |
| | | | | 192/110 B |
| 2003/0075412 A1 | * | 4/2003 | Heiartz | F16D 23/14 |
| | | | | 192/20 |
| 2013/0206531 A1 | * | 8/2013 | Tanaka | F16D 13/585 |
| | | | | 192/48.1 |

FOREIGN PATENT DOCUMENTS

| | | | | |
|---|---|---|---|---|
| CN | 103415720 A | 11/2013 | | |
| CN | 104121325 A | 10/2014 | | |
| DE | 10102831 A1 | 8/2001 | | |
| DE | 102009038344 A1 | * | 2/2011 | ............ B60K 6/387 |
| DE | 102011014097 A1 | 9/2011 | | |
| DE | 102014206330 A1 | 10/2014 | | |
| WO | 2014026685 A1 | 2/2014 | | |

OTHER PUBLICATIONS

International Search Report for PCT/DE2016/200315; 2 pgs; dated Mar. 1, 2017 by European Patent Office.

* cited by examiner

COUPLING MODULE FOR A DRIVE TRAIN OF A MOTOR VEHICLE

CROSS-REFERENCE TO RELATED APPLICATIONS

This application is the United States National Phase of PCT Appln. No. PCT/DE2016/200315 filed Jul. 12, 2016, which claims priority to German Application No. DE102015213101.7 filed Jul. 13, 2015, the entire disclosures of which are incorporated by reference herein.

TECHNICAL FIELD

The present disclosure concerns a coupling module for a drive train of a motor vehicle.

BACKGROUND

WO 2014/026685 A1 discloses a hybrid module. In the hybrid module for a drive train of a motor vehicle, an electrical machine is arranged between an internal combustion engine and the transmission. The hybrid module has a rotor element configured as a rotor of the electrical machine, and usually a friction clutch arranged downstream thereof. Many known (dry) friction clutches comprise at least one (friction) coupling unit with a pressure plate and a counter plate.

BRIEF SUMMARY

The present disclosure describes a compact coupling module which can be installed in a space-saving manner in a hybrid drive train of a motor vehicle.

In a hybrid module, it is provided that this hybrid module has an intermediate element via which the counter plate, or at least one of the counter plates, of the coupling device is fixedly connected to the rotor element. At least one pressure plate and/or intermediate plate of the coupling device is here connected rotationally fixedly but axially displaceably to the rotor element via the at least one intermediate element. The result is a compact plate connection which is advantageous in particular for multiplate clutches. The intermediate element may be arranged radially outside the plates (pressure plate(s), counter plate(s) and any intermediate plates) of the coupling device.

The rotor element may be the rotor of the electrical machine or another rotor element which can be driven by the electrical machine, in particular a roller which can be driven via a belt drive.

Further embodiments are characterized by the following features.

It may be provided that the connection of the at least one pressure plate and/or intermediate plate to the intermediate element takes place via at least one leaf spring.

Alternatively or additionally, it may be provided that the connection of the at least one of the pressure plate and/or the intermediate plate to the intermediate element takes place via at least one recess-engagement structure.

Here it may be provided that the at least one intermediate element is formed as a tube or pot, wherein at least one slot is formed in the tubular or pot-like intermediate element and forms the recess of the recess-engagement structure for engagement of at least one engagement element of the pressure plate and/or the intermediate plate.

A spring element may be provided between the recess and the engagement element.

It may be provided that the coupling device is configured as a multiplate clutch, in particular a dual clutch, with a plurality of clutches.

It may be provided here that the connection between the rotor element and one of the counter plates is a direct connection, in particular a direct connection between a rotor core of the rotor element and this counter plate. The at least one other counter plate is then connected to the rotor element via the intermediate element. The intermediate element may here be arranged (a) between the rotor element and the at least one other counter plate, or (b) between the counter plate directly connected to the rotor element and the at least one other counter plate.

It may be provided that the hybrid module includes a separating clutch arranged inside the rotor element.

The hybrid module may comprise a (function) unit of the rotor element, the separating clutch and a coupling part including the counter plate of the coupling device. This preassembled unit may then be installed in a housing unit of the hybrid module.

It may be provided that the hybrid module also has a decoupling device for actuating the separating clutch. The decoupling device here may have a pressure pad for transmission of force from the release bearing to the contact plate of the separating clutch, and a central decoupling unit with a piston for transmission of force to the release bearing. The central decoupling unit may be a concentric slave cylinder (CSC) unit.

It may be provided that the hybrid module has a dual mass flywheel arranged in the drive train upstream of the separating clutch.

The hybrid module may have an engine-side intermediate wall.

BRIEF DESCRIPTION OF THE DRAWINGS

Example embodiments are shown in the following figures.

The drawings show.

DETAILED DESCRIPTION

Figure 1:
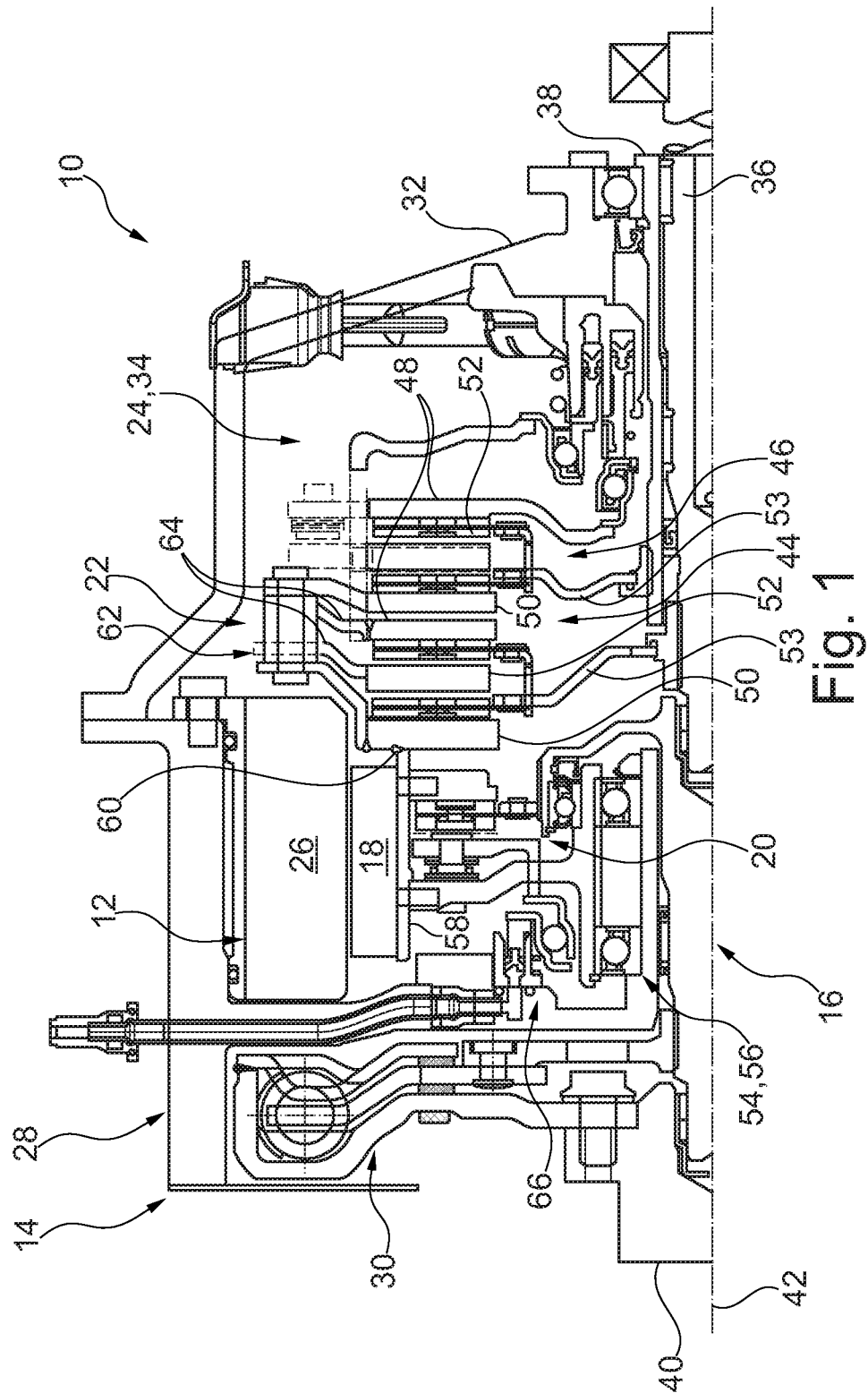
FIG. 1 shows a top half cross-section view of a hybrid module according to an example embodiment.

FIG. 1 shows a part of the drive train 10 of a motor vehicle in a sectional depiction. In the drive train 10, an electrical machine 12 is arranged between an internal combustion engine (not shown) and a transmission (also not shown). The electrical machine 12 serves as a drive machine and is part of the hybrid module 14. This hybrid module 14 has the following main components: (i) a function unit 16 with a rotor element 18 formed as a rotor of the electrical machine 12, a K0 separating clutch 20 arranged inside the rotor element 18, and at least one coupling part 22 of a coupling device 24 connected rotationally fixedly to the rotor element 18, (ii) a housing unit 28 partially accommodating the function unit 16 and a stator 26 of the electrical machine 12, (iii) a dual mass flywheel 30 arranged in the drive train 10 upstream of the separating clutch 20, and (iv) a housing part 32 accommodating the coupling device 24. The coupling device 24 is formed as a dual clutch 34. Accordingly, the transmission is formed as a dual clutch transmission, of which only the two transmission input shafts 36, 38 are shown.

The following drive train path results: output shaft 40 from internal combustion engine—dual mass flywheel 30—K0 separating clutch 20—rotor element 18, i.e. rotor of the electrical machine 12 formed as an internal rotor—coupling device 24—transmission input shaft 36, 38. The corresponding shafts 36, 38, 40 here lie on a common axis 42 which forms the main axis of the hybrid module 14.

The coupling device 24 configured as a dual clutch 34 has two clutches (coupling units) 44, 46 with corresponding pressure plates 48, counter plates 50, intermediate plates 52, clutch discs 53 and actuation devices.

In its interior, the rotor element 18 has a rotor bearing 54 which serves as a central bearing device 56. Via this bearing device 56, the entire function unit 16 is rotatably mounted in the housing unit 28. The rotationally fixed connection between the rotor element 18 and the coupling part 22 in this example is formed as a direct connection 60 between a rotor core 58 of the rotor element 18 and one of the counter plates 50 of the coupling device 24. A connection between the counter plates 50 takes place via an intermediate element 62. The connection of the pressure plate 48 and the intermediate plate 52 to the intermediate element 62 takes place via a respective leaf spring 64. This reduces the axial installation space required on the external diameter of the coupling device 24.

The hybrid module 14 furthermore includes a decoupling device 66 for actuation of the separating clutch 20. This decoupling device 66 has a pressure pad for transmission of force from the release bearing to the contact plate of the separating clutch, and a central decoupling unit with a piston for transmission of force to the release bearing. The central decoupling unit is here a concentric slave cylinder (CSC) unit.

Figure 2:
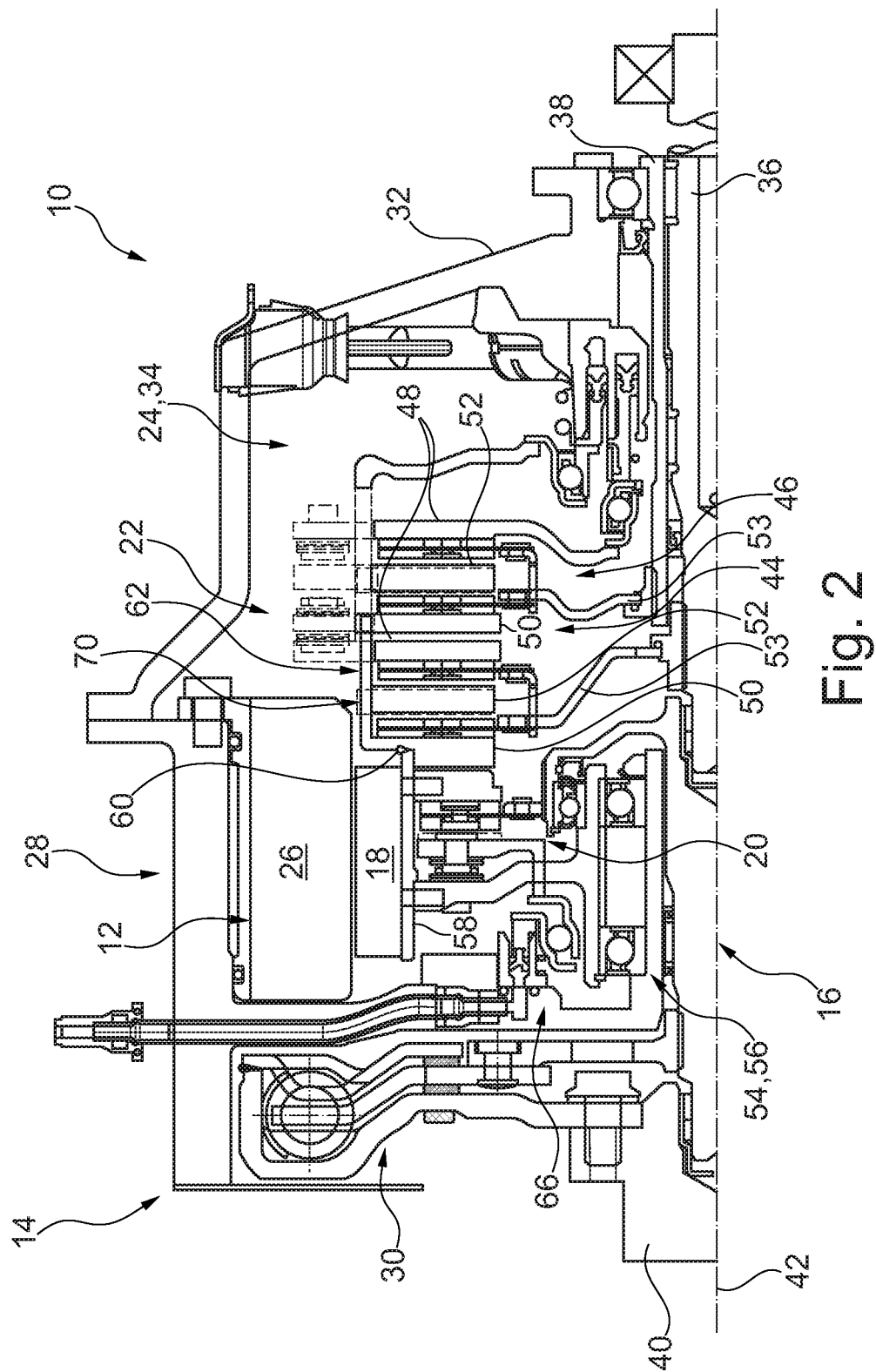
FIG. 2 shows a top half cross-section view of a hybrid module according to a further example embodiment.

FIG. 2 shows a further embodiment of the hybrid module 14. This substantially corresponds to the embodiment of the hybrid module 14 from FIG. 1, so here only the differences are discussed.

In this embodiment, the intermediate element 62 is formed tubular. The counter plate 50 directly connected to the rotor element 18, and the tubular intermediate element 62, form a pot-like unit. At least one recess 68, configured as a slot, of the recess-engagement structure 70 (shown in FIG. 3) is formed in the tubular intermediate element 62. This recess 68 allows an engagement of at least one engagement element 72 of the pressure plate 48 and/or the intermediate plate 52. Via this engagement, the pressure plates 48 and intermediate plates 52 of the clutch device 24 configured as a multiplate clutch are connected rotationally fixedly but axially displaceably to the rotor element 18 via the at least one intermediate element 62. The slots in the tubular intermediate element 62 allow an axial movement and a radial torque transmission.

Figure 3:
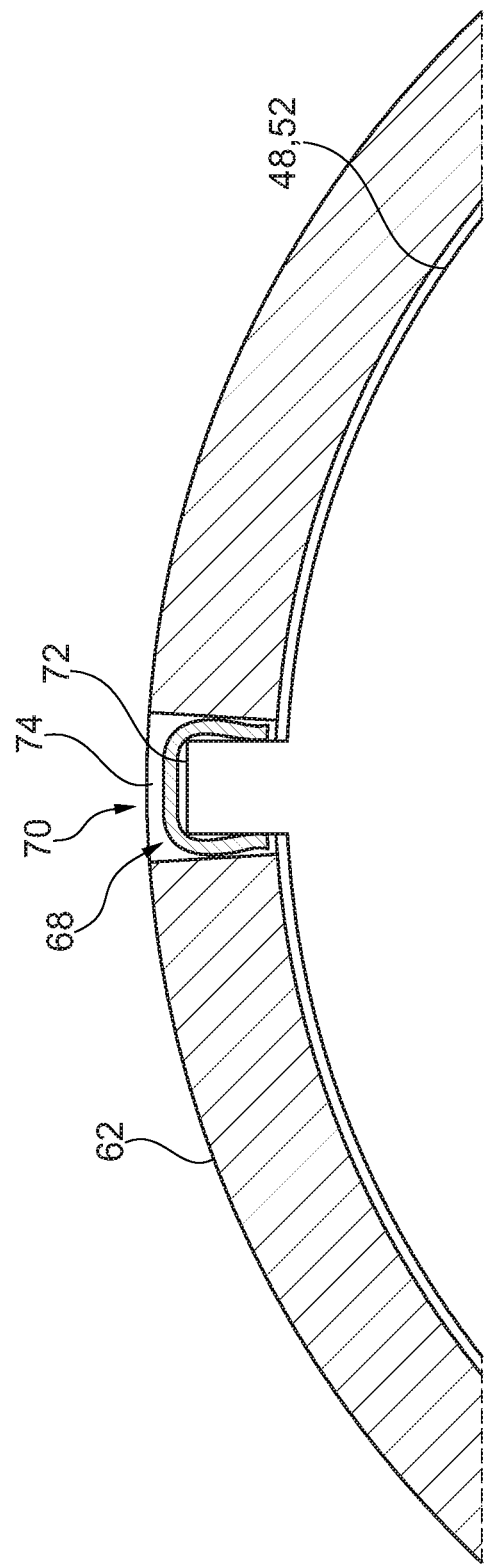
FIG. 3 shows a detail view of the connection of a pressure plate or intermediate plate of the coupling device to a tubular intermediate element of the hybrid module shown in FIG. 2.

FIG. 3 furthermore depicts a spring element 74 arranged between the recess 68 and the engagement element 72. Such spring elements 74 can prevent disruptive rattling between the pressure and intermediate plates 48, 52 on one side and the slots in the tubular intermediate element 62 on the other.

The hybrid modules 14 shown allow excellent use of installation space below the stator 26. The unit 16 with such a coupling device 24 can easily be inserted in the stator 26.

Although the present disclosure has been described above with reference to an exemplary embodiment, it is understood that different embodiments and modifications may be made without leaving the scope of the present disclosure as defined in the attached claims.

With regard to further features and advantages, reference is made expressly to the disclosure of the drawings.

LIST OF REFERENCE SIGNS

10 Drive train
12 Electrical machine
14 Hybrid module
16 Function unit
18 Rotor element
20 Separating clutch, K0
22 Coupling part
24 Coupling device
26 Stator, electrical machine
28 Housing unit
30 Dual mass flywheel
32 Housing part (transmission)
34 Dual clutch
36 Transmission input shaft, first
38 Transmission input shaft, second
40 Output shaft
42 Axis
44 Clutch, first
46 Clutch, second
48 Pressure plate
50 Counter plate
52 Intermediate plate
53 Clutch discs
54 Rotor bearing
56 Bearing device, central (function unit)
58 Rotor core
60 Connection
62 Intermediate element
64 Leaf spring
66 Decoupling device
68 Slot
70 Recess-engagement structure
72 Engagement element
74 Spring element

The invention claimed is:

1. A coupling module for a drive train of a motor vehicle, comprising:
   a rotor element;
   a coupling device including a clutch, the clutch including:
      a pressure plate;
      an intermediate plate;
      a first clutch disc arranged axially between the pressure plate and the intermediate plate;
      a counter plate fixed to the rotor element; and,
      a second clutch disc arranged axially between the intermediate plate and the counter plate; and,
   an intermediate element rotationally fixed and axially displaceable relative to the pressure plate and the intermediate plate by respective leaf springs.

2. The coupling module of claim 1, wherein:
   the coupling module is a hybrid module;
   the motor vehicle includes an electrical machine, an internal combustion engine and a transmission; and,
   the rotor element can be driven by the electrical machine.

3. The coupling module of claim 2 wherein the electrical machine is integrated in the coupling module.

4. The coupling module of claim 1 wherein the coupling device is formed as a dual clutch comprising the clutch and a second clutch.

5. The coupling module of claim 1 wherein the rotor element comprises a core and the counter plate is fixed to the core.

6. The coupling module of claim 1 further comprising a separating clutch arranged inside the rotor element.

7. The coupling module of claim 6, further comprising a dual mass flywheel arranged in the drive train upstream of the separating clutch.

8. The coupling module of claim 1 wherein the respective leaf springs are arranged radially outside of the first clutch disc and the second clutch disc.

9. A coupling module for a drive train of a motor vehicle, comprising:
- a rotor element;
- a coupling device including a clutch, the clutch including:
  - a pressure plate;
  - an intermediate plate; and,
  - a counter plate fixed to the rotor element and,
- an intermediate element rotationally fixed and axially displaceable relative to the pressure plate or the intermediate plate by at least one recess-engagement structure, wherein:
- the intermediate element is formed as a tube or pot with at least one slot; and,
- the slot forms a recess of the recess-engagement structure.

10. The coupling module of claim 9, further comprising a spring element arranged between the recess and an engagement element of the pressure plate or the intermediate plate.

11. The coupling module of claim 8, wherein:
- the coupling module is a hybrid module;
- the motor vehicle includes an electrical machine, an internal combustion engine and a transmission; and,
- the rotor element can be driven by the electrical machine.

12. The coupling module of claim 11 wherein the electrical machine is integrated in the coupling module.

13. The coupling module of claim 8 wherein the coupling device is formed as a dual clutch comprising the clutch and a second clutch.

14. The coupling module of claim 8 wherein the rotor element comprises a core and the counter plate is fixed to the core.

15. The coupling module of claim 8 further comprising a separating clutch arranged inside the rotor element.

16. The coupling module of claim 15, further comprising a dual mass flywheel arranged in the drive train upstream of the separating clutch.

17. The coupling module of claim 8 further comprising a stator element for driving the rotor element, wherein the respective leaf springs are at least partially radially aligned with the stator element.

* * * * *